(12) United States Patent
Chung et al.

(10) Patent No.: US 8,505,016 B2
(45) Date of Patent: Aug. 6, 2013

(54) ENHANCED SHORTEST-JOB-FIRST MEMORY REQUEST SCHEDULING

(75) Inventors: Jaewoong Chung, Bellevue, WA (US); Debarshi Chatterjee, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 284 days.

(21) Appl. No.: 12/850,754

(22) Filed: Aug. 5, 2010

(65) Prior Publication Data

US 2012/0036512 A1 Feb. 9, 2012

(51) Int. Cl.
*G06F 9/46* (2006.01)
(52) U.S. Cl.
USPC ......................................... 718/103
(58) Field of Classification Search
None
See application file for complete search history.

(56) References Cited

U.S. PATENT DOCUMENTS

| | | | |
|---|---|---|---|
| 6,378,051 B1 * | 4/2002 | Henson et al. | 711/151 |
| 6,909,691 B1 | 6/2005 | Goyal et al. | |
| 6,928,646 B1 * | 8/2005 | James et al. | 718/104 |
| 2001/0056456 A1 * | 12/2001 | Cota-Robles | 709/103 |
| 2002/0181440 A1 * | 12/2002 | Norman et al. | 370/351 |
| 2003/0221071 A1 | 11/2003 | McKenney et al. | |
| 2004/0226015 A1 * | 11/2004 | Leonard et al. | 718/100 |
| 2007/0124793 A1 | 5/2007 | Wang et al. | |
| 2008/0222640 A1 * | 9/2008 | Daly et al. | 718/103 |
| 2008/0320323 A1 | 12/2008 | Brittain et al. | |
| 2009/0043991 A1 | 2/2009 | Guo et al. | |
| 2009/0049545 A1 | 2/2009 | Nagpal et al. | |
| 2009/0055580 A1 * | 2/2009 | Moscibroda et al. | 711/104 |
| 2009/0094478 A1 | 4/2009 | Harper et al. | |
| 2009/0216962 A1 * | 8/2009 | Mutlu et al. | 711/151 |
| 2009/0307691 A1 | 12/2009 | Moscibroda et al. | |
| 2010/0182624 A1 * | 7/2010 | Murakami | 358/1.9 |
| 2011/0276972 A1 | 11/2011 | Chung et al. | |
| 2011/0276973 A1 | 11/2011 | Chung et al. | |
| 2011/0276974 A1 | 11/2011 | Chung et al. | |

OTHER PUBLICATIONS

Chung, Jaewoong et al., "The Common Case Transactional Behavior of Multithreaded Programs," Twelfth International Symposium on High-Performance Computer Architecture, Feb. 11-15, 2006, Austin, TX, pp. 1-12.
Cloud Computing, Wikipedia, downloaded Oct. 23, 2009.
Intel, "Intel Core i7 Processor," downloaded Oct. 23, 2009, 2 pages.
Kim, Yoongu et al., "ATLAS: A Scalable and High-Performance Scheduling Algorithm for Multiple Memory Controllers," HPCA, Jan. 2010, 12 pages.

(Continued)

*Primary Examiner* — Diem Cao
*Assistant Examiner* — Adam Lee
(74) *Attorney, Agent, or Firm* — Abel Law Group, LLP (57) ABSTRACT

In at least one embodiment of the invention, a method includes scheduling a memory request associated with a thread executing on a processing system. The scheduling is based on a job length of the thread and a priority step function of job length. The thread is one of a plurality of threads executing on the processing system. In at least one embodiment of the method, the priority step function is a function of $\lceil x/2n \rceil$ for $x \leq m$ and $P(x) = m/2^n$ for $x > m$, where x is the number of memory requests in a memory request queue and n and m are integers. In at least one embodiment of the method, the priority step function is a function of $2^n \times \lceil \log_2(x) \rceil$, where x is the number of memory requests in a memory request queue and n is an integer.

14 Claims, 6 Drawing Sheets

OTHER PUBLICATIONS

Micron DDR2 SDRAM, 2006, 130 pages.

Moscibroda, Thomas and Mutlu, Onur, "Memory Performance Attacks: Denial of Memory Service in Multi-Core Systems," Technical Report MSR-TR-2007-15, Proceedings of the 16th USENIX Security Symposium (USENIX Security), pp. 257-274, (21 pages), Boston, MA, Aug. 2007.

Mutlu, Onur and Moscibroda, Thomas, "Stall-Time Fair Memory Access Scheduling for Chip Multiprocessors," Proceedings of the 40th International Symposium on Microarchitecture (MICRO), Dec. 2007, 13 pages.

Mutlu, Onur, and Moscibroda, Thomas, "Parallelism-Aware Batch Scheduling: Enhancing both Performance and Fairness of Shared DRAM Systems," ISCA-36, 2008, 12 pages.

Nesbit, Kyle J. et al., "Fair Queuing Memory Systems," Proceedings of the 39th Annual IEEE/ACM International Symposium on Microarchitecture, 2006, 12 pages.

Rai, Idris A., et al., "Performance Analysis of LAS-based Scheduling Disciplines in a Packet Switched Network," SIGMETRICS/Performance '04, Jun. 12-16, 2004, 12 pages.

Righter, Rhonda and Shanthikumar, J. George, "Scheduling Multiclass Single Server Queueing Systems to Stochastically Maximize the Number of Successful Departures," Probability in the Engineering and Informational Sciences, Cambridge University Press, 3:323-333, 1989.

Rixner, Scott et al., "Memory Access Scheduling," ISCA-27 (2000), 11 pages.

* cited by examiner

ENHANCED SHORTEST-JOB-FIRST MEMORY REQUEST SCHEDULING

BACKGROUND

1. Field of the Invention

The invention is related to computing systems and more particularly to memory request scheduling in computing systems.

2. Description of the Related Art

In a typical computing system, a memory controller is an intermediary between a processor (e.g., central processing unit, digital signal processor, graphics processor, processor core, or core) and main memory (e.g., synchronous dynamic random access memory, i.e., SDRAM) that prioritizes and schedules memory requests (e.g., reads and writes from and to main memory, respectively). The memory controller schedules memory requests by prioritizing memory requests, translating the memory requests into a sequence of memory commands, and issuing to memory the sequence of memory commands associated with a highest priority memory request. A typical processing system (e.g., a chip multiprocessor system) executes one or more threads concurrently on one or more processors. Accordingly, multiple threads executing on the one or more processors may contend with each other for memory bandwidth. Thus, there is a need to facilitate memory request scheduling in processing systems.

SUMMARY OF EMBODIMENTS OF THE INVENTION

In at least one embodiment of the invention, a method includes scheduling a memory request associated with a thread executing on a processing system. The scheduling is based on a job length of the thread and a priority step function of job length. The thread is one of a plurality of threads executing on the processing system. In at least one embodiment of the method, the priority step function is a function of $\lceil x/2n \rceil$ for $x \leq m$ and $P(x)=m/2^n$ for $x>m$, where x is the number of memory requests in a memory request queue and n and m are integers. In at least one embodiment of the method, the priority step function is a function of $2^n \times \lceil \log_2(x) \rceil$, where x is the number of memory requests in a memory request queue and n is an integer.

In at least one embodiment of the invention, a memory controller includes a memory request buffer and a scheduler. The scheduler is operative to schedule a memory request from the memory request buffer. The memory request is associated with a thread executing on a processing system. The memory request is scheduled based on a job length of the thread and a priority step function of job length. The thread is one of a plurality of threads executing on the processing system.

In at least one embodiment of the invention, a tangible computer-readable medium encodes a representation of an integrated circuit, the integrated circuit includes a memory request buffer. The integrated circuit includes a scheduler operative to schedule a memory request from the memory request buffer. The memory request is associated with a thread executing on a processing system. The scheduler schedules the memory request based on a job length of the thread and a priority step function of job length. The thread is one of a plurality of threads executing on the processing system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
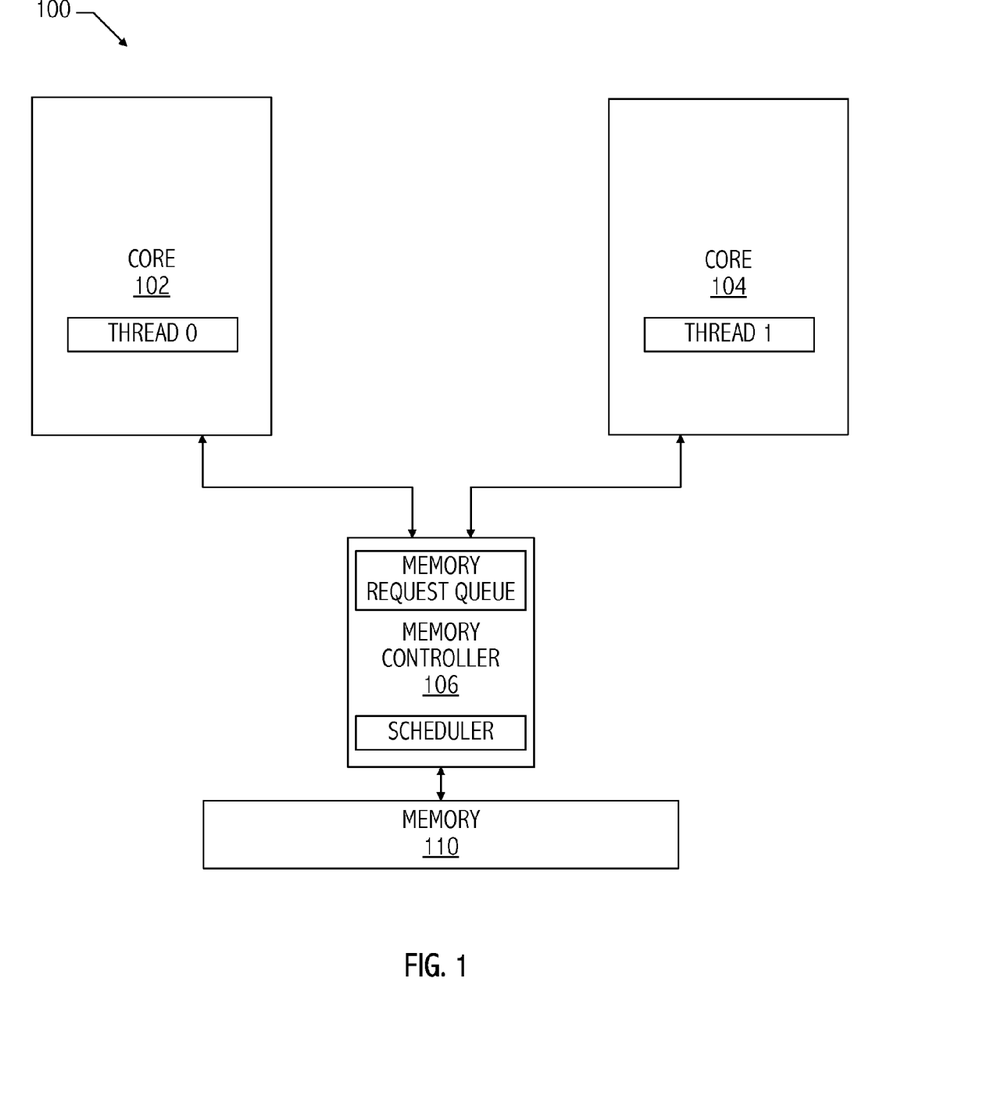
FIG. 1 illustrates a functional block diagram of an exemplary processing system.

Referring to FIG. 1, in an exemplary processing system (e.g., system 100), multiple threads (e.g., thread 0 and thread 1) execute on the system concurrently on one or more processors (e.g., core 102 and core 104). A memory controller (e.g., memory controller 106) provides the one or more processors access to a particular portion of memory space (e.g., memory 110). Memory controller 106 stores memory requests received from cores 102 and 104 in at least one memory request queue. A scheduler of memory controller 106 schedules memory requests received from thread 0 and thread 1 and stored in the memory request queue to memory 110.

Figure 2:
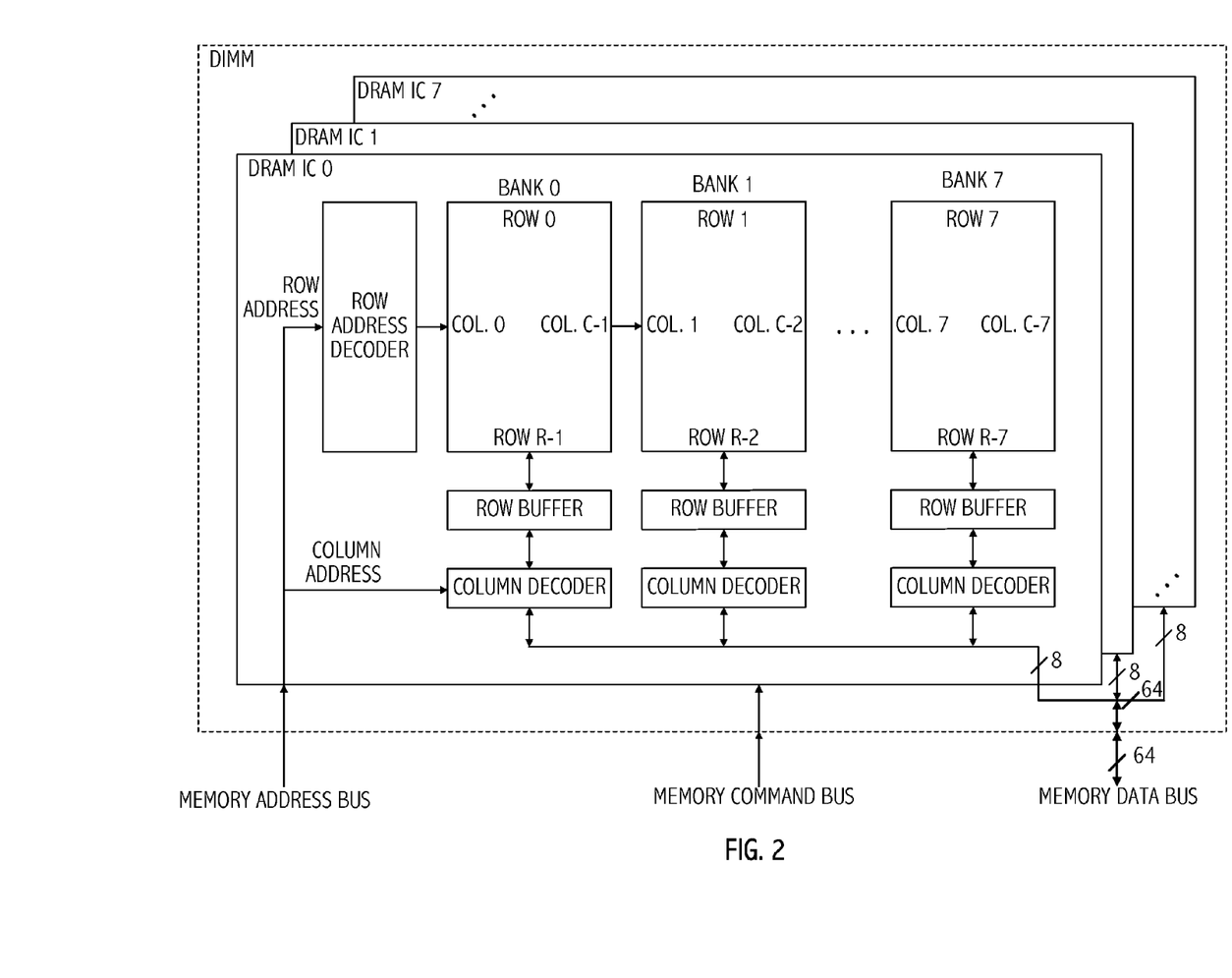
FIG. 2 illustrates a functional block diagram of an exemplary memory system consistent with at least one embodiment of the invention.

Referring to FIG. 2, an exemplary memory system (e.g., memory 110) includes one or more memory integrated circuits (e.g., one or more DRAM integrated circuits). In at least one embodiment, the memory system includes multiple memory integrated circuits, which are accessed in parallel (e.g., configured as a dual in-line memory module, i.e., DIMM). In at least one embodiment of the memory system, each memory integrated circuit includes a data interface (e.g., 8-bit data interface) that is combined with data interfaces of other memory integrated circuits to form a wider data interface (e.g., 64-bit data interface). In at least one embodiment of the memory system, each memory integrated circuit includes multiple independent memory banks, which can be accessed in parallel. In at least one embodiment of the memory system, each memory bank includes a two-dimensional array of DRAM (i.e., dynamic random access memory) cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

Figure 3A:
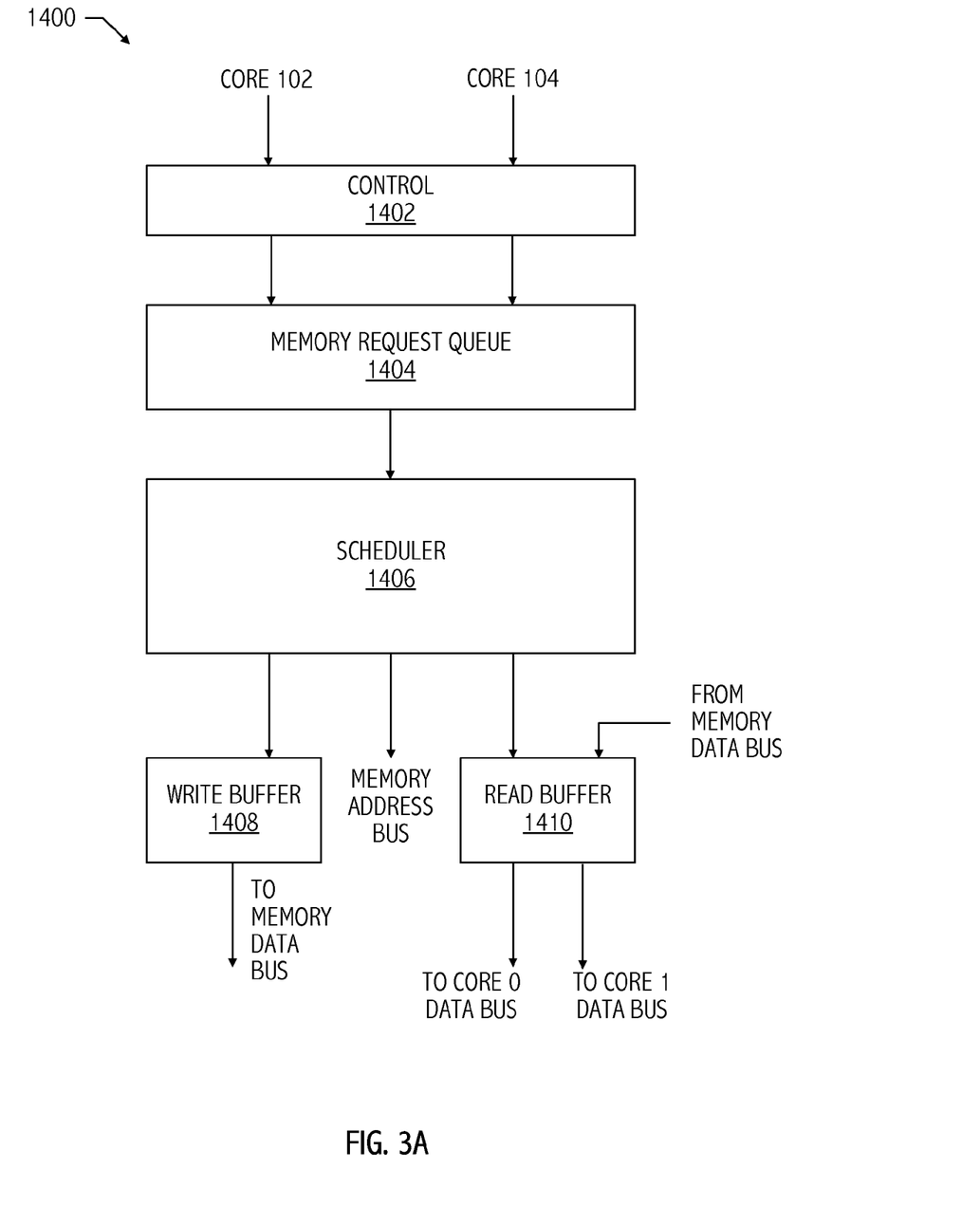
FIGS. 3A and 3B illustrate functional block diagrams of exemplary memory controllers consistent with various embodiments of the invention.
Figure 3B:
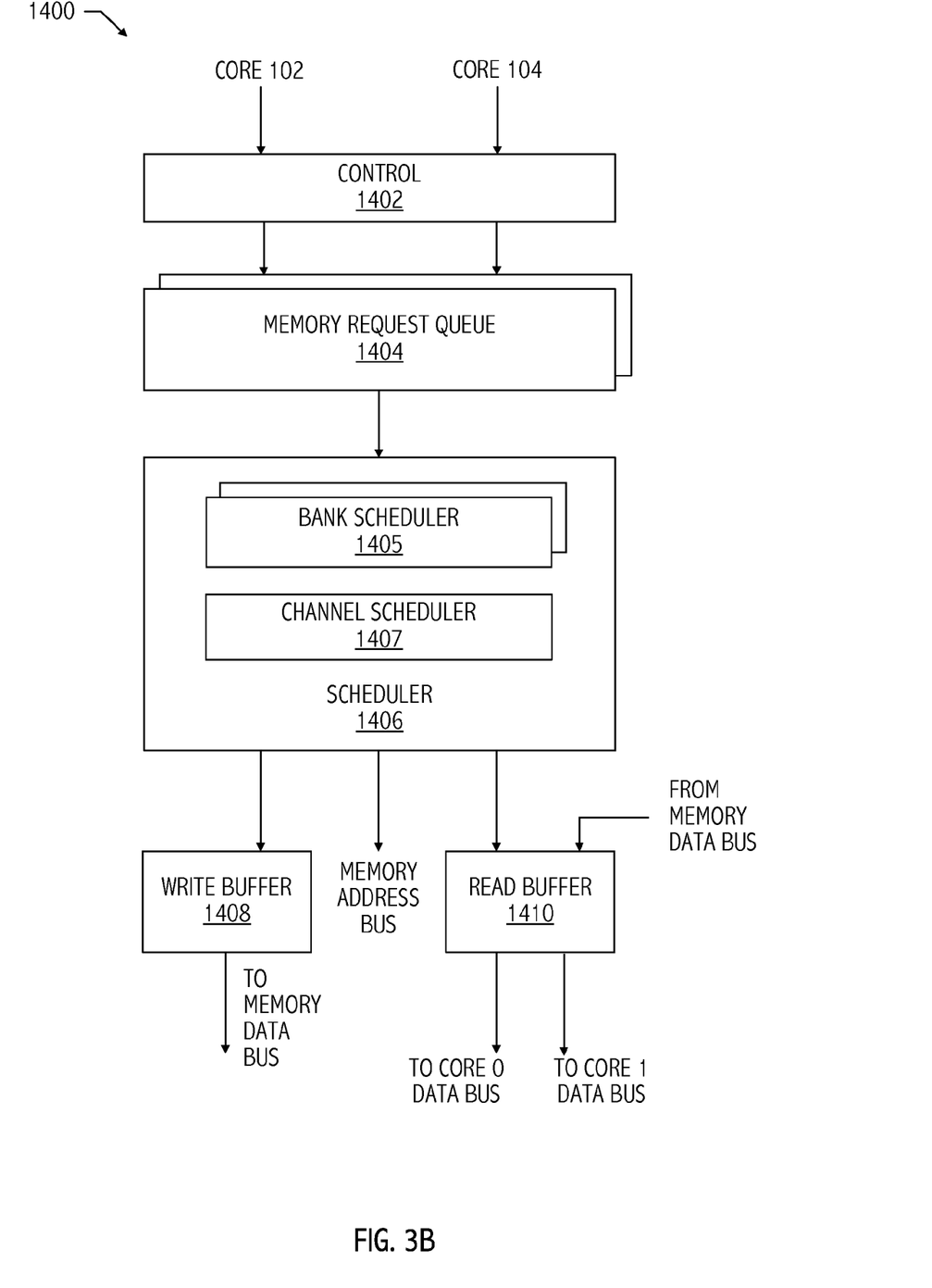

Referring to FIGS. 3A and 3B, an exemplary memory controller (e.g., memory controller 1400) receives memory requests from one or more processors (e.g., core 102 and core 104). Control circuit 1402 assigns an arrival time to each memory request and stores the arrival time with the memory request (e.g., request type and request identifier) in memory request queue 1404. Scheduler 1406 prioritizes the memory requests and schedules the memory requests by reordering the memory requests into one or more sequences of memory commands based on the priorities. Scheduler 1406 sequentially executes the memory commands via a memory address bus and a memory data bus. Referring to FIG. 3B, in at least one embodiment, the portion of memory serviced by memory controller 1400 includes multiple memory banks, memory request buffer 1404 includes a request buffer for memory requests corresponding to each memory bank, and scheduler 1406 includes a bank scheduler for each memory bank (e.g., bank schedulers 1405) and a channel scheduler (e.g., channel scheduler 1407).

Still referring to FIG. 3B, in at least one embodiment of memory controller 1400, a bank scheduler 1405 selects pending memory requests with the highest priority from a corresponding memory request queue and generates a sequence of memory commands to read or write the request data to or from the memory, respectively. In at least one embodiment, bank scheduler 1405 monitors timing constraints for a corresponding memory bank to ensure that a sequence of memory commands complies with memory specifications. If a memory command is ready with respect to the memory specifications, then bank scheduler 1405 sends the command to channel scheduler 1407. In at least one embodiment, channel scheduler 1407 reorders and/or interleaves memory requests in priority order (e.g., highest priority commands first) from each of the bank schedulers 1405 into memory commands, which are issued on the memory address bus and signal write buffer 1408 and read buffer 1410. Channel scheduler 1407 sends an acknowledgement to a corresponding bank scheduler 1405 when channel scheduler 1407 issues a memory command and bank scheduler 1405 updates a state accordingly. Channel scheduler 1407 also monitors the state of the memory address and data buses and bank timing constraints to reduce or eliminate channel scheduling conflicts and timing constraint violations.

In at least one embodiment of memory controller 1400, bank schedulers 1405 and channel scheduler 1407 use the same priority policies. Referring to FIG. 3A, in at least one embodiment, memory controller 1400 services only one memory bank and scheduler 1406 does not include bank schedulers 1405 and channel scheduler 1407. Accordingly, as referred to herein, a "scheduler" is any one of a bank scheduler, a channel scheduler, a scheduler from a memory controller servicing only one memory bank, or other suitable memory request scheduler unless otherwise specified. In addition, note that memory controller 1400 of FIG. 3A and memory controller 1400 of FIG. 3B are exemplary only and techniques described herein are applicable to other memory controller architectures.

A typical scheduler uses shortest-job-first scheduling, which schedules memory requests based on job length of a thread requesting the memory access. The typical scheduler measures job length of a thread by counting a number of outstanding requests of the thread in one or more memory request queues. The scheduler schedules first those requests of a thread having the shortest job length (e.g., the fewest memory requests in a memory request queue). In general, shortest-job-first scheduling reduces the average response time of the memory system as compared to other scheduling techniques. However, shortest-job-first scheduling favors newly-received short jobs over prior-received long jobs. Since memory-intensive applications having many memory requests in a memory request queue typically suffer from long cache miss latencies randomly, typical shortest-job-first scheduling techniques may introduce jitter into the response time of long jobs. For example, if short jobs occur sporadically while a long job is running, the long job is interrupted and delayed repeatedly, resulting in a high jitter in job handling time. Shortest-job-first scheduling is associated with a low jitter when job length disparity is great between jobs (e.g., jobs with an order of magnitude difference between job lengths, 10:1 or greater). However, as the disparity is decreased (e.g., disparity between jobs is less than an order of magnitude different, for example, 5:4) the jitter associated with shortest-job-first scheduling increases.

Figure 4:
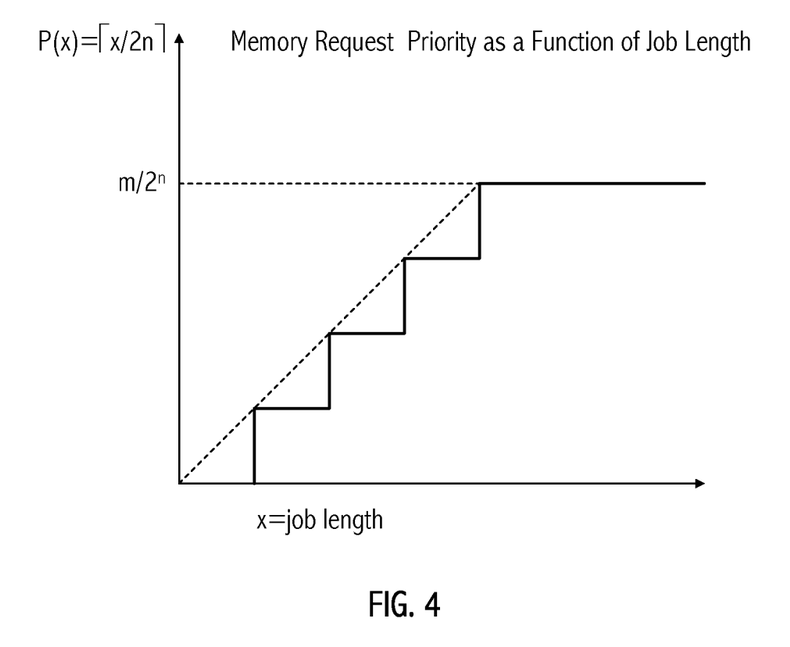
FIG. 4 illustrates a bounded linear priority function consistent with at least one embodiment of the invention.
Figure 5:
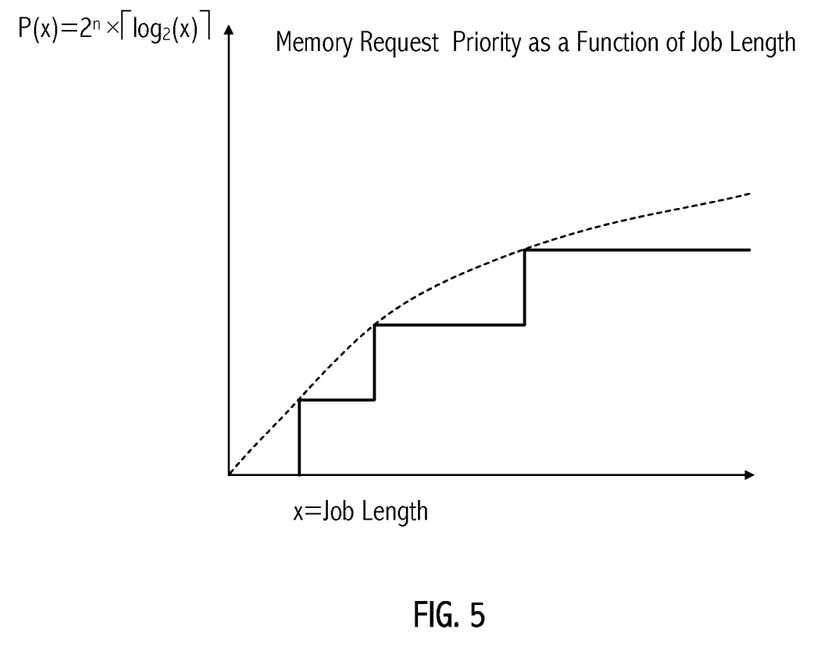
FIG. 5 illustrates a stepping log priority function consistent with at least one embodiment of the invention.

In at least one embodiment, memory controller 1400 enhances memory request scheduling fairness as compared to a memory controller implementing shortest-job-first scheduling. Memory controller 1400 determines the length of a job by counting the number of memory requests in a memory request queue and assigns a priority to memory requests of the job according to a priority function of job length. Referring to FIGS. 4 and 5, in at least one embodiment of memory controller 1400, the priority function of job length is a step function of job length, i.e., each step groups jobs of similar or same lengths with a priority that decrements slowly for longer jobs of lower priority. In at least one embodiment of memory controller 1400, a higher priority value indicates a lower priority. Memory controller 1400 schedules memory requests with the highest priority before memory requests with a lower priority.

In at least one embodiment, memory controller 1400 groups memory requests in one or more memory request queues into epochs. In at least one embodiment of memory controller 1400, an epoch includes all pending memory requests in the one or more memory request queues when the epoch is created. Memory controller 1400 creates a new epoch when all memory requests in the previous epoch are processed. The epoch length can be tuned by running target applications on a system and determining an acceptable or optimal epoch length. Exemplary epoch lengths are in the range of $1\times10^6$ to $10\times10^6$ memory cycles. Within a particular epoch, a job is a set of memory requests issued from a particular thread. The number of threads in the processing system equals the number of processors in the processing system times the number of hardware thread contexts supported per processor. The number of hardware thread contexts is greater than one if a processor supports simultaneous multithreading. In at least one embodiment, memory controller 1400 calculates the job length by counting the number of memory requests in the memory request queue from an associated thread in the epoch.

Referring to FIG. 4, in at least one embodiment, memory controller 1400 uses a bounded linear function of job length to determine the priority of a particular job. In at least one embodiment, job lengths that have a particular value, or are within a predetermined number of memory requests (e.g., +/−Δ) from the particular value, are assigned the same priority value. In at least one embodiment, memory controller 1400 uses a bounded linear function. An exemplary bounded linear function is a bounded step function:

$$P(x) = \lceil x/2n \rceil \text{ for } x <= m; \text{ and}$$

$$P(x) = m/2^n \text{ for } x > m,$$

where x is the job length, n and m are selectable integer parameters, and $\lceil\ \rceil$ is a ceiling operator, i.e., $\lceil y \rceil$, ceil (y), or ceiling(y), where $\lceil y \rceil$ is the smallest integer greater than or equal to y. In at least one embodiment of memory controller 1400, other bounded step functions are used, e.g., a bounded function of a floor operation (i.e. $\lfloor y \rfloor$, floor (y), or int(y), where $\lfloor y \rfloor$ is the largest integer less than or equal to y) or a bounded function of a rounding operation (i.e., $\lfloor y \rceil$, $\|y\|$, $\lfloor y+0.5 \rfloor$, [y], nint(y), or round(y), where round(y) is the nearest positive integer to y), or other suitable bounded linear functions may be used.

Referring to FIG. 5, in at least one embodiment, memory controller 1400 uses a stepping log function of job length to determine the priority of a particular job. For example, the stepping log function is $$P(x) = 2^n \times \lceil \log_2(x) \rceil,$$

where n is a selectable integer parameter. In FIGS. 4 and 5, a lower P(x) indicates a higher priority job, however other conventions may be used. The functions of FIGS. 4 and 5 can be easily computed using digital logic. For example, the bounded linear function of FIG. 4 can be computed by shifting to the right n times the contents of a register containing a job length (i.e., x). However, other suitable techniques for computing $x/2^n$ may be used. The stepping log function of FIG. 5 can be computed by finding the location of the first non-zero bit (i.e., the first '1') in a power of two expression for the job length, x. Then, the digit number of the location+1 is shifted to the left n times. However, other suitable techniques for computing $2^n \lceil \log_2(x) \rceil$ may be used. Note that the stepping log function is exemplary only and other stepping functions e.g., a stepping square-root function, i.e., $P(x) = 2^n \times \lceil \sqrt{x} \rceil$ may be used. To ease implementation of a particular function, embodiments of memory controller 1400 obtain values of P(x) by accessing a look-up table or other data structure stored in a storage element according to values of job length, x.

Similar to a linear function of job length (e.g., P(x)=x), the bounded linear function and the stepping log function (FIGS. 4 and 5, respectively), assign higher priorities to shorter jobs to thereby reduce the average response time as compared to other functions of job length. However, unlike the linear function of unbounded job length, the bounded step function and the stepping log function slowly reduce the decrease in priority for increasing job lengths. The bounded linear function of job length assigns the same priority to all long jobs having job lengths greater than $m/2^n$, thus not further penalizing those long jobs. The stepping log function of job length groups together jobs having different lengths by assigning the same priority to those jobs having job lengths with the same value of $\lceil \log_2(x) \rceil$ (i.e., those jobs are on the same step of the priority curve of FIG. 5), but with a step length that increases exponentially for longer job lengths with a slow priority increment. Thus, the stepping log function of job length evenly prioritizes long jobs of similar lengths, which further improves fairness of the scheduling policy as compared to a scheduling policy that applies a linear function of job length. Techniques described herein contemplate other functions of job length, e.g., a bounded stepping log function of job length, or other functions of job length.

Figure 6:
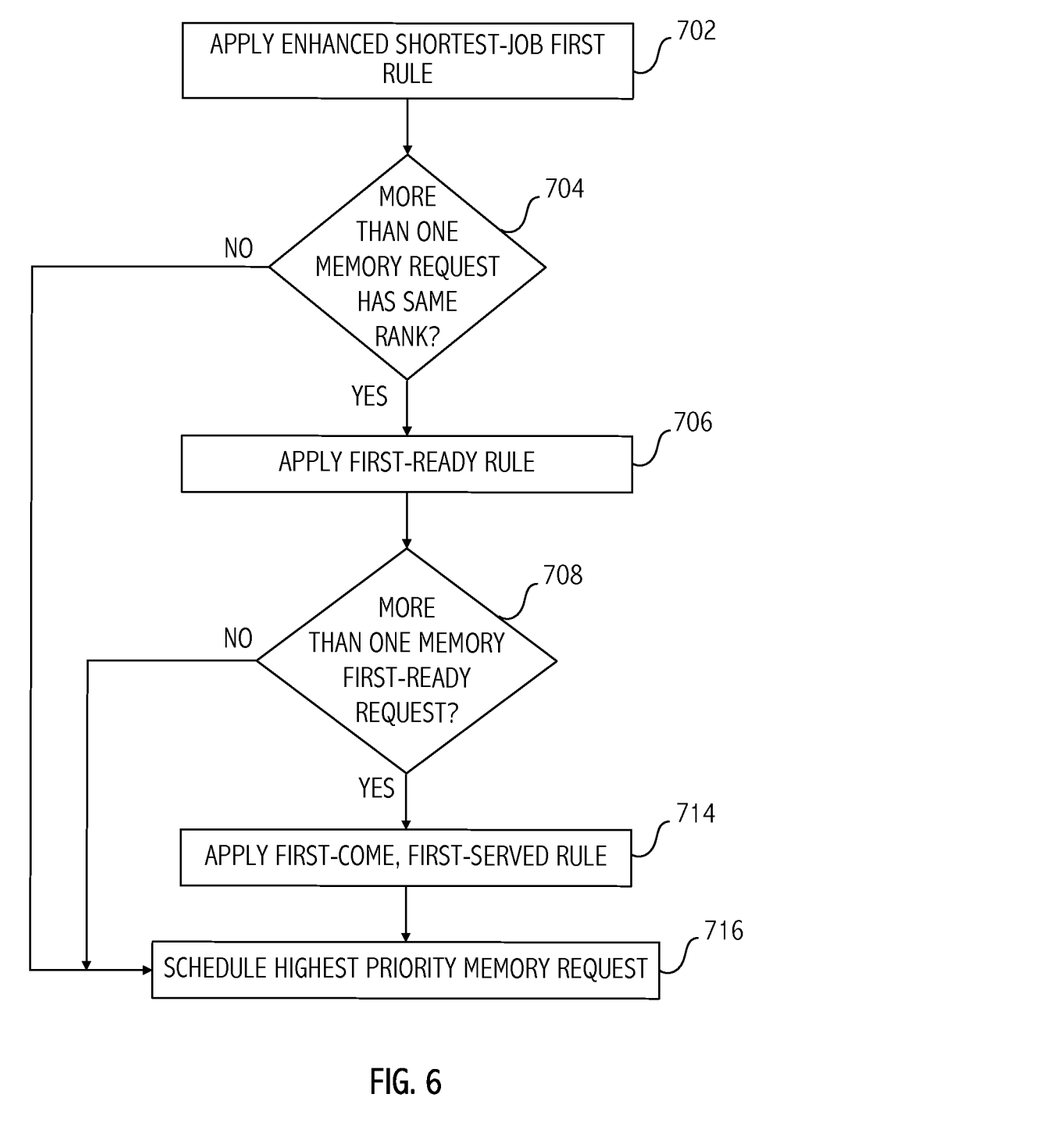
FIG. 6 illustrates information and control flows of a memory scheduler consistent with at least one embodiment of the invention.

Referring to FIG. 6 in at least one embodiment, memory-controller 1400 schedules memory requests by first applying a rank rule based on the priorities assigned to memory requests according to the enhanced shortest-job-first scheduling technique, as described above, i.e., the memory controller schedules a memory request of a thread with a higher priority before a memory request of a thread with a lower priority (702). In at least one embodiment of the enhanced shortest-job-first scheduling technique, if multiple memory requests are associated with the same priority under the enhanced shortest job first rule (704), then the memory controller applies a first-ready rule to prioritize between those memory requests, i.e., a memory request that hits a row buffer is given higher priority over a memory request that misses a row buffer (706). In at least one embodiment of an enhanced shortest-job-first scheduling technique, if two or more memory requests associated with the same priority under the enhanced shortest job first rule also have the same priority under the first-ready rule (708), then the memory controller applies a first-come, first-served rule to prioritize between those memory requests, i.e., a memory request received earlier is prioritized over a memory request received later (714). Once the memory controller identifies the memory request associated with the highest priority, the memory controller schedules the associated memory access (716). Note that the order and type of prioritization rules of FIG. 6 are exemplary only and other prioritization rules may be used consistent with enhanced shortest-job-first techniques described herein.

Structures described herein may be implemented using software (which includes firmware) executing on a processor or by a combination of software and hardware. Software, as described herein, may be encoded in at least one tangible computer readable medium. As referred to herein, a tangible computer-readable medium includes at least a disk, tape, or other magnetic, optical, or electronic storage medium.

While circuits and physical structures are generally presumed, it is well recognized that in modern semiconductor design and fabrication, physical structures and circuits may be embodied in tangible computer-readable descriptive form suitable for use in subsequent design, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., HDL, Verilog, GDSII data) of such circuits, systems, and methods, all as described herein, and as defined in the appended claims.

The description of the invention set forth herein is illustrative, and is not intended to limit the scope of the invention as set forth in the following claims. For example, while the invention has been described in an embodiment in which an SDRAM memory system is used, one of skill in the art will appreciate that the teachings herein can be utilized for other memory systems (e.g., phase chance memory systems or memrister memory systems). Variations and modifications of the embodiments disclosed herein may be made based on the description set forth herein, without departing from the scope and spirit of the invention as set forth in the following claims.

What is claimed is:

1. A method comprising:
   scheduling a memory request associated with a thread executing on a processing system, the scheduling being based on a job length of the thread and a priority step function of job length, the job length of the thread being based on a number of memory requests associated with the thread and in a memory request queue during an epoch, at least one priority level output of the priority step function being associated with multiple distinct values of job length, the priority step function gradually decreasing priorities of threads associated with increasing job lengths, and the thread being one of a plurality of threads executing on the processing system.

2. The method, as recited in claim 1, further comprising: creating a new epoch in response to scheduling all memory requests in the memory request queue during the epoch.

3. The method, as recited in claim 1, wherein the job length of the thread is associated with a first step of the priority step function and the memory request has a priority higher than a memory request associated with a second thread having a job length associated with a second step of the priority step function.

4. The method, as recited in claim 1, wherein the priority step function is a bounded function of job length.

5. The method, as recited in claim 1, wherein the priority step function is a function of $\lceil x/2n \rceil$ for $x<=m$ and $P(x)=m/2^n$ for $x>m$, where x is the number of memory requests in the memory request queue and n and m are integers.

6. The method, as recited in claim 1, wherein the priority step function is a stepping log function of job length.

7. The method, as recited in claim 1, wherein the priority step function is a function of $2^n \times \lceil \log_2(x) \rceil$, where x is the number of memory requests in the memory request queue and n is an integer.

8. A memory controller comprising:

a memory request buffer; and a scheduler operative to schedule a memory request from the memory request buffer, the memory request being associated with a thread executing on a processing system, the memory request being scheduled based on a job length of the thread and a priority step function of job length, the job length of the thread being based on a number of memory requests associated with the thread in the memory request buffer during an epoch, at least one priority level output of the priority step function being associated with multiple distinct values of job length, the priority step function gradually decreasing priorities of threads associated with increasing job lengths, and the thread being one of a plurality of threads executing on the processing system.

9. The memory controller, as recited in claim 8, wherein the job length of the thread is associated with a first step of the priority step function and the memory request has a priority higher than a memory request associated with a second thread having a job length associated with a second step of the priority step function.

10. The memory controller, as recited in claim 8, wherein the priority step function is a bounded function of job length.

11. The memory controller, as recited in claim 8, wherein the priority step function is a function of $\lceil x/2n \rceil$ for $x<=m$ and $P(x)=m/2^n$ for $x>m$, where x is the number of memory requests in the memory request buffer and n and m are integers.

12. The memory controller, as recited in claim 8, wherein the priority step function is a stepping log function of job length.

13. The memory controller, as recited in claim 8, wherein the priority step function is a function of $2^n \times \lceil \log_2(x) \rceil$, where x is the number of memory requests in the memory request buffer and n is an integer.

14. A non-transitory computer-readable medium encoding a representation of an integrated circuit, the integrated circuit comprising:

a memory request buffer; and a scheduler operative to schedule a memory request from the memory request buffer, the memory request being associated with a thread executing on a processing system, the memory request being scheduled based on a job length of the thread and a priority step function of job length, the job length of the thread being based on a number of memory requests associated with the thread in the memory request buffer during an epoch, at least one priority level output of the priority step function being associated with multiple distinct values of job length, the priority step function gradually decreasing priorities of threads associated with increasing job lengths, and the thread being one of a plurality of threads executing on the processing system.

* * * * *